US007566760B2

(12) United States Patent
Chowdhry et al.

(10) Patent No.: US 7,566,760 B2
(45) Date of Patent: *Jul. 28, 2009

(54) PREPARATION OF AQUEOUS POLYMER DISPERSIONS

(75) Inventors: Mubarik Mahmood Chowdhry, Strasbourg (FR); Markus Schmid, Deidesheim (DE); Peter Preishuber-Pfluegl, Ludwigshafen (DE); Xavier Sava, Mannheim (DE); Horst Weiss, Neuhofen (DE); Stefan Mecking, Freiburg (DE); Martin Zuideveld, Freiburg-Tiengen (DE); Florian M. Bauers, Freiburg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 459 days.

This patent is subject to a terminal disclaimer.

(21) Appl. No.: 10/524,216

(22) PCT Filed: Jul. 24, 2003

(86) PCT No.: PCT/EP03/08091

§ 371 (c)(1), (2), (4) Date: Feb. 10, 2005

(87) PCT Pub. No.: WO2004/020478

PCT Pub. Date: Mar. 11, 2004

(65) Prior Publication Data

US 2005/0250920 A1 Nov. 10, 2005

(30) Foreign Application Priority Data

Aug. 29, 2002 (DE) .............................. 102 40 577

(51) Int. Cl.
C08F 4/26 (2006.01)
C08F 4/70 (2006.01)
C08F 2/22 (2006.01)

(52) U.S. Cl. ..................... 526/93; 526/97; 526/172; 526/161; 526/161.9; 526/652; 526/348; 526/348.5; 526/348.6; 526/346; 526/347.1

(58) Field of Classification Search .............. 526/91, 526/192, 169, 169.1, 164, 343, 348.5, 348.6, 526/346, 172, 161, 93; 524/579, 836
See application file for complete search history.

(56) References Cited

U.S. PATENT DOCUMENTS

| 3,635,937 | A | 1/1972 | Bauer et al. |
| 3,637,636 | A | 1/1972 | Bauer et al. |
| 3,661,803 | A | 5/1972 | Bauer et al. |
| 3,686,159 | A | 8/1972 | Bauer et al. |
| 4,698,403 | A | 10/1987 | Klabunde |
| 4,716,205 | A | 12/1987 | Klabunde |
| 5,108,654 | A | 4/1992 | Ragaini |
| 5,574,091 | A | 11/1996 | Walther et al. |
| 6,737,483 | B1 * | 5/2004 | Tomov et al. ............... 526/93 |
| 6,800,699 | B2 * | 10/2004 | Schmid et al. ............... 526/93 |

FOREIGN PATENT DOCUMENTS

| CN | 1 322 717 | 11/2001 |
| DE | 197 56 874 | 6/1999 |
| EP | 0 046 328 | 2/1982 |
| EP | 0 046 331 | 2/1982 |
| EP | 0 052 929 | 6/1982 |
| GB | 2 250 930 | 6/1992 |
| WO | 97/17380 | 5/1997 |
| WO | 98/30609 | 7/1998 |
| WO | 98/42664 | 10/1998 |
| WO | 98/42665 | 10/1998 |
| WO | WO 00/20464 * | 4/2000 |
| WO | 00/56785 | 9/2000 |
| WO | 01/44325 | 6/2001 |
| WO | WO 01/44325 A1 * | 6/2001 |

OTHER PUBLICATIONS

Mecking, Stefan et al. "Emulsion- and Suspension-Type Aqueous Coordination Polymerization Affording Ethylene Homo- and Copolymers", Polymeric Materials: Science & Engineering, vol. 84, pp. 1049-1050, XP008025447 2001.

Bauers, Florian M. et al. "High Molecular Mass Polyethylene Aqueous Latexes by Catalytic Polymerization", Angew. Chem. Int. Ed., vol. 40, No. 16, pp. 3020-3022, XP008025448 2001.

Rodriguez, Ferdinand. "Carbon Chain Polymers", Principles of Polymer Systems, $2^{nd}$ edition, pp. vii-xi, 381-429 1982.

Brintzinger, Hans H. et al. "Stereospecific Olefin Polymerization with Chiral Metallocene Catalysts", Angew. Chem. Int. Ed. Engl., vol. 34, pp. 1143-1170 1995.

(Continued)

*Primary Examiner*—David Wu
*Assistant Examiner*—Rip A. Lee
(74) *Attorney, Agent, or Firm*—Oblon, Spivak, McClelland, Maier & Neustadt, P.C.

(57) ABSTRACT

The invention relates to a method for the production of aqueous polymer dispersions, by the polymerisation of one or more olefins in aqueous media in the presence of dispersing agents and optionally organic solvents, characterised in that the polymerisation of the olefin(s) is catalysed by means of one or more complex compounds of general formula (I), where at least one of the groups $R^1$ to $R^9$ must be in the form of a group of the following general formula (II) where Z=an electron-withdrawing group and n=a whole number from 1 to 5.

11 Claims, No Drawings

OTHER PUBLICATIONS

Wang, Lin et al. "Coordination Polymerization of Ethylene by Single-Component Rhodium Catalysts in Protic Solvents", J. Am. Chem. Soc., vol. 115, pp. 6999-7000 1993.

Keim, Wilhelm et al. "Novel Coordination of (Benzoylmethylene)triphenyl-phosphorane in a Nickel Oligomerization Catalyst", Angew. Chem. Int. Ed. Engl., vol. 17, No. 6, pp. 466-467 1978.

Johnson, Lynda K. et al. "New Pd(II)- and Ni(II)-Based Catalysts for Polymerization of Ethylene and alpha-Olefins", J. Am. Chem. Soc., vol. 117, pp. 6414-6415 1995.

Killian, Christopher M. et al. "Living Polymerization of alpha-Olefins Using NiII-alpha-Diimine Catalysts. Synthesis of New Block Polymers Based on alpha-Olefins", J. Am. Chem. Soc., vol. 118, pp. 11664-11665 1996.

Nelson, L.T.J. et al. "Polymerization and 1D and 2D NMR Analysis of Alpha-Olefins from Late Transition Metal Catalysts", Polymer Preprints, vol. 38, pp. 133-134 1997.

Wang, Chunming et al. "Neutral Nickel(II)-Based Catalysts for Ethylene Polymerization", Organometallics, vol. 17, pp. 3149-3151 1998.

Cramer, Richard. "4. Di-$\mu$-Chlorotetrakis(Ethylene)Dirhodium(I), 2,4-Pentanedionatobis(Ethylene)Rhodium(I), and Di-$\mu$-Chlorotetracarbonyldirhodium(I)", Inorganic Syntheses, vol. 15, pp. 14-18 1974.

"Perlpolymerisation mit Hilfe von Dispergatoren", Methoden der organischen Chemie, vol. XIV/1, pp. 411-420 1961.

"Anionaktive Emulgatoren", Methoden der organischen Chemie, vol. XIV/1, pp. 192-208 1961.

Tang, P.L. et al. "Miniemulsion Polymerization- A Comparative Study of Preparative Variables", Journal of Applied Polymer Science, vol. 43, pp. 1059-1066 1991.

Wiese, Harm. "Eigenschaften von Polymerdispersionen und Messmethoden", Waessrige Polymerdispersionen, chapter 4, $1^{st}$ edition, pp. 31-66 1999.

Kanig, Von Gerhard. "Zur Theorie der Glastemperatur von Polymerhomologen, Copolymeren und weichgemachten Polymeren", Kolloid-Zeitschrift & Zeitschrift fuer Polymere, vol. 190, pp. 1-16 1963.

Fox, T.G. "J5. Influence of Diluent and of Copolymer Composition on the Glass Temperature of a Polymer System", Bull. Am. Phys. Soc., p. 123 1956.

"Polyacryl- und Polymethacryl-Verbindungen", Ullmann's Encyclopaedie der technischen Chemie, vol. 19, pp. 18-19, $4^{th}$ edition 1980.

* cited by examiner

PREPARATION OF AQUEOUS POLYMER DISPERSIONS

The present invention relates to a process for preparing aqueous polymer dispersions by polymerizing one or more olefins in an aqueous medium in the presence of dispersants and, if desired, of organic solvents which comprises catalyzing the polymerization of said olefin(s) using one or more metal complex compounds of the formula I

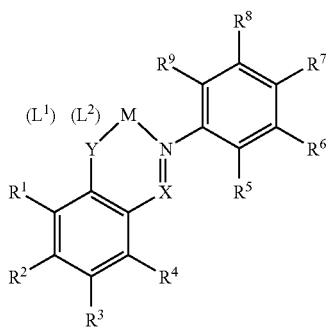

where the substituents and indices have the following meanings:

M is a transition metal from groups 7 to 10 of the periodic table of the elements, $L^1$ denotes phosphanes $(R^{16})_x PH_{3-x}$ or amines $(R^{16})_x NH_{3-x}$ with identical or different radicals $R^{16}$, ethers $(R^{16})_2 O$, $H_2O$, alcohols $(R^{16})OH$, pyridine, pyridine derivatives of the formula $C_5H_{5-x}(R^{16})_x N$, CO, $C_1$-$C_{12}$ alkylnitriles, $C_6$-$C_{14}$ arylnitriles or ethylenically unsaturated double bond systems, x denoting an integer from 0 to 3, $L^2$ denotes halide ions, amide ions $(R^{16})_h NH_{2-h}$, h denoting an integer from 0 to 2, and also $C_1$-$C_6$ alkyl anions, allyl anions, benzyl anions or aryl anions, it being possible for $L^1$ and $L^2$ to be linked to one another by one or more covalent bonds, X: is CR or nitrogen atom (N)

R: is hydrogen,
$C_1$-$C_6$ alkyl groups,
$C_7$-$C_{13}$ aralkyl radicals or
$C_6$-$C_{14}$ aryl groups, unsubstituted or substituted by one or more $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ or $C_1$-$C_{12}$ thioether groups, Y: is OH group, oxygen, sulfur, N—$R^{10}$ or P—$R^{10}$, N: is nitrogen atom $R^1$ to $R^9$: are independently of one another hydrogen,
$C_1$-$C_{12}$ alkyl, it being possible for the alkyl groups to be branched or unbranched,
$C_1$-$C_{12}$ alkyl substituted one or more times by identical or different substituents selected from $C_1$-$C_{12}$ alkyl groups, halogens, $C_1$-$C_{12}$ alkoxy groups and $C_1$-$C_{12}$ thioether groups,
$C_7$-$C_{13}$ aralkyl,
$C_3$-$C_{12}$ cycloalkyl,
$C_3$-$C_{12}$ cycloalkyl substituted one or more times by identical or different substituents selected from $C_1$-$C_{12}$ alkyl groups, halogens, $C_1$-$C_{12}$ alkoxy groups and $C_1$-$C_{12}$ thioether groups,
$C_6$-$C_{14}$ aryl,
$C_6$-$C_{14}$ aryl substituted by identical or different substituents selected from one or more $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ and $C_1$-$C_{12}$ thioether groups,
$C_1$-$C_{12}$ alkoxy groups,
silyloxy groups $OSiR^{11}R^{12}R^{13}$,
halogens,
$NO_2$ groups or
amino groups $NR^{14}R_{15}$, it being possible in each case for two adjacent radicals $R^1$ to $R^9$ to form with one another a saturated or unsaturated 5- to 8-membered ring, $R^{10}$ to $R^{16}$ independently of one another are hydrogen,
$C_1$-$C_{20}$ alkyl groups, which may be substituted in turn by $O(C_1$-$C_6$ alkyl) or $N(C_1$-$C_6$ alkyl)$_2$ groups,
$C_3$-$C_{12}$ cycloalkyl groups,
$C_7$-$C_{13}$ aralkyl radicals or $C_6$-$C_{14}$ aryl groups, at least one of the radicals $R^1$ to $R^9$ necessarily being in the form of a radical of the formula II below

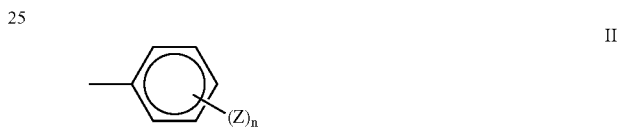

where Z is an electron-withdrawing group and n is an integer from 1-to 5.

The present invention further relates to aqueous dispersions of polyolefins or copolymers of two or more olefins and also to the use of the aqueous dispersions of the invention for paper applications such as paper coating or surface sizing, paints and varnishes, adhesive base materials, molded foams such as mattresses, textile and leather applications, carpet-backing coatings or pharmaceutical applications.

The customary processes for preparing aqueous polymer dispersions from the olefins ethene, propene and/or 1-butene make use either of free-radical high-pressure polymerization or else of the preparation of secondary dispersions. These processes are hampered by disadvantages. The free-radical polymerization processes require extremely high pressures, are restricted on the industrial scale to ethylene and ethylene copolymers, and require apparatus which is very expensive both to obtain and to maintain (F. Rodriguez, Principles of Polymer Systems, 2nd Edition, McGraw-Hill, Singapore 1983, page 384). Another possibility is first to polymerize the aforementioned olefins by any desired process and then to prepare a secondary dispersion, as described in U.S. Pat. No. 5,574,091 for example. This method is a multistage process and is therefore very complex.

It was therefore desirable to prepare aqueous polymer dispersions of olefins, such as the industrially available olefins ethylene, propylene, butylene, etc., in one process step by polymerizing the olefins in an aqueous medium. Moreover, polymerization in an aqueous medium has the advantage, very generally, that as a result of the process it is easy to remove the heat of polymerization. Finally, generally speaking, polymerization reactions in aqueous systems are of interest purely on account of the fact that water is a cheap and environment-friendly solvent.

For the metal-complex-catalyzed polymerization of olefins it is possible to draw on the following prior art.

With electrophilic transition metal compounds such as TiCl₄ (Ziegler-Natta catalyst) or metallocenes it is possible to polymerize olefins, as described, for example, by H.-H. Brintzinger et al. in *Angew. Chem.* 1995, 107, 1255ff., *Angew. Chem., Int. Ed. Engl.* 1995, 34, 1143ff. However, both TiCl₄ and metallocenes are moisture-sensitive and therefore poorly suited to polymerizing olefins in an aqueous medium. The aluminum alkyl cocatalysts used are also sensitive to moisture, and so water, as a catalyst poison, must be rigorously excluded.

There have been only a few reports of transition-metal catalyzed reactions of olefins, such as ethylene, for example, in aqueous medium. For instance, L. Wang et al. report in *J. Am. Chem. Soc.* 1993, 115, 6999ff. on a rhodium-catalyzed polymerization. At around one insertion/hour, however, the activity is much too low for industrial applications.

The reaction of ethylene with nickel-P, O-chelate complexes, as described in U.S. documents U.S. Pat. No. 3,635,937, U.S. Pat. No. 3,637,636, U.S. Pat. No. 3,661,803, and U.S. Pat. No. 3,686,159, appears significantly more promising. A disadvantage is that the reported activities are too low.

EP-A 46331 and EP-A 46328 report on the reaction of ethylene with Ni-chelate complexes of the formula A

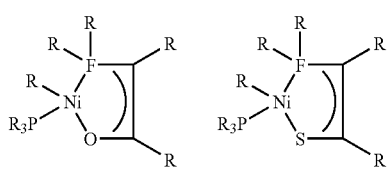

R denoting identical or different organic substituents of which one carries a sulfonyl group, and F denoting phosphorus, arsenic or nitrogen. Under the chosen reaction conditions in solvents such as methanol or mixtures of methanol and a hydrocarbon the only products are oligomers, which are unsuitable for the applications mentioned above. The advantage of the sulfonated derivatives over unsulfonated compounds, as are described by W. Keim et al. in *Angew. Chem.* 1978, 90, 493ff.; *Angew. Chem., Int. Ed. Engl.* 1978, 6, 466ff., lies in their higher activity.

In U.S. Pat. No. 4,698,403 (column 7, lines 13-18) and in U.S. Pat. No. 4,716,205 (column 6, lines 59-64) it is disclosed that an excess of water relative to bidentate Ni-chelate complexes acts as a catalyst poison even if they carry an SO₃⁻ group.

From the documents cited above it is apparent that numerous Ni complexes are not polymerization-active in the presence of water.

It is also known from WO 97/17380 that palladium compounds of the formula B,

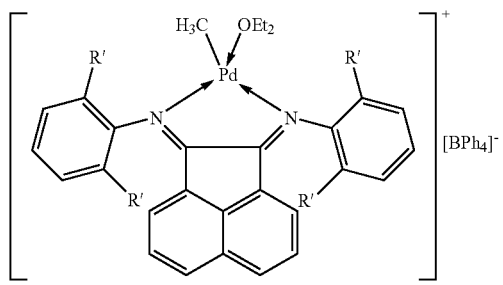

Et = C₂H₅, Ph = Phenyl where R' is, for example, isopropyl groups, or the analogous nickel compounds, are able to polymerize higher olefins such as 1-octene in an aqueous environment. One option is to add an emulsifier in order to facilitate the polymerization. However, it is pointed out that the temperature of 40° C. ought not to be exceeded, since otherwise the catalyst becomes deactivated (page 25, lines 5 et seq.). Higher reaction temperatures, however, are generally desirable, since they allow the activity of a catalyst system to be increased.

A disadvantage of catalyst systems of the formula B, furthermore, is that, with ethylene, highly branched polymers are generally formed (L. K. Johnson, *J. Am. Chem. Soc.* 1995, 117, 6414ff.; C. Killian, *J. Am. Chem. Soc.* 1996, 118, 11664ff.), which to date have been less important industrially, and that with higher α-olefins (L. T. Nelson, *Polymer Preprints* 1997, 38, 133ff.) the phenomenon of "chain running" of the active complexes is observed. Chain running leads to a large number of 1, ω-misinsertions, as a result of which, generally, amorphous polymers are produced whose suitability as materials is limited.

From WO 98/42665 it is known, furthermore, that complexes of the formula C

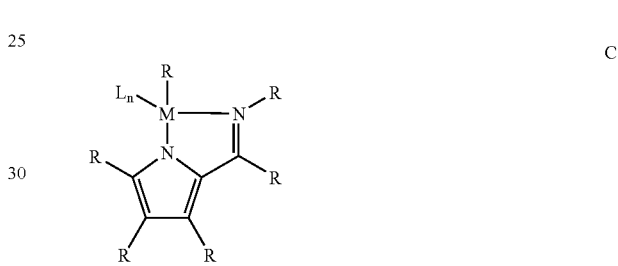

with M=Ni or Pd and n neutral ligands L are polymerization-active in the presence of small amounts of water without detriment to the catalytic activity (page 16, line 13). These amounts of water must not, however, exceed 100 equivalents, based on the complex (page 16, lines 30 and 31). Under these conditions, however, it is not possible to carry out polymerization in an aqueous medium.

Furthermore, it is known from WO 98/42664 that complexes of the formula D

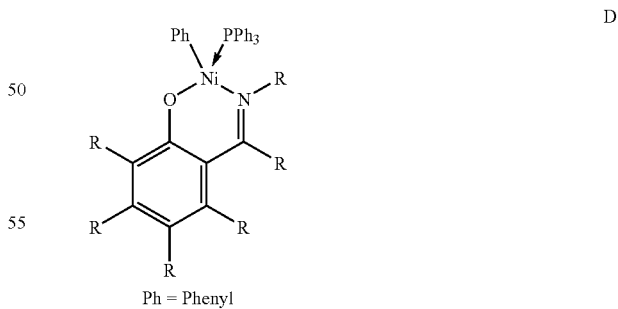

Ph = Phenyl with identical or different radicals R ought to be capable of polymerizing ethylene in the presence of small amounts of water (see page 17, lines 14 et seq.). These amounts of water, however, ought not to exceed 100 equivalents, based on the complex (page 17, lines 33 to 35). Under these conditions, however, polymerization in an aqueous medium is inconceivable.

It is an object of the present invention to remedy the disadvantages described and to provide a novel process for preparing aqueous polymer dispersions by polymerizing one or more olefins in an aqueous medium in the presence of metal complex compounds, which process, among other advantages, is easy to carry out and leads to dispersions of olefin polymers with high molar masses.

We have found that this object is achieved—that is, that aqueous. olefin polymer dispersions whose polymers have high molecular weights are obtained—by the process defined at the outset.

Olefins suitable for the process of the invention for the preparation of homopolymers include: ethylene, propylene, 1-butene, 1-pentene, 1-hexene, 1-heptene, 1-octene, 1-decene, and 1-eicosene, but also branched olefins such as 4-methyl-1-pentene, norbornene, vinylcyclohexene, and vinylcyclohexane, and also styrene, para-methylstyrene, and para-vinylpyridine, preference being given to ethylene and propylene. Ethylene is particularly preferred.

The copolymerization of two or more olefins is also possible with the process of the invention, the coolefins used being selectable from the following groups:

Apolar 1-olefins, such as ethylene, propylene, 1-butene, 1-pentene, 1-hexene, 1-heptene, 1-octene, 1-decene, and 1-eicosene, but also branched olefins, such as 4-methyl-1-pentene, vinylcyclohexene, and vinylcyclohexane, and also styrene, para-methylstyrene, and para-vinylpyridine, preference being given to ethylene, propylene, 1-butene, 1-pentene, 1-hexene, 1-heptene, 1-octene, and 1-decene.

Olefins containing polar groups, such as acrylic acid, acrylic acid $C_1$-$C_8$ alkyl esters, 2-hydroxyethyl acrylate, 3-hydroxypropyl acrylate, 4-hydroxybutyl acrylate, methacrylic acid, methacrylic acid $C_1$-$C_8$ alkyl esters, $C_1$-$C_6$ alkyl vinyl ethers and vinyl acetate, but also 10-undecenoic acid, 3-butenoic acid, 4-pentenoic acid, 5-hexenoic acid, and also styrene-4-sulfonic acid. Preference is given to acrylic acid, methyl acrylate, ethyl acrylate, n-butyl acrylate, 2-ethylhexyl acrylate, 2-hydroxyethyl acrylate, methyl methacrylate, ethyl methacrylate, n-butyl methacrylate, ethyl vinyl ether, vinyl acetate, 10-undecenoic acid, 3-butenoic acid, 4-pentenoic acid, and 5-hexenoic acid.

The fraction of coolefins in the olefin mixture to be polymerized is freely selectable and is normally <50% by weight, frequently ≦40% by weight, and often ≦30% by weight or ≦20% by weight. Where olefins containing polar groups in particular are used for the copolymerization, their fraction in the olefin mixture to be polymerized is generally ≧0.1% by weight, ≧0.2% by weight or ≧0.5% by weight and ≦2% by weight, ≦5% by weight or ≦10% by weight.

It is preferred to use exclusively ethylene. Where at least two olefins are used for the polymerization, they are frequently selected from the group consisting of ethylene, propylene, 1-butene, 1-hexene, and styrene. It is common to use ethylene in combination with propylene, 1-butene, 1-hexene or styrene.

In the metal complex compounds of the formula I the radicals are defined as follows:

M is a transition metal from groups 7 to 10 of the periodic table of the elements, preferably manganese, iron, cobalt, nickel or palladium, and with particular preference nickel or palladium, $L^1$ is selected from phosphanes of the formula $(R^{16})_xPH_{3-x}$ or amines of the formula $(R^{16})_xNH_{3-x}$, x being an integer between 0 and 3. However, ethers $(R^6)_2O$ such as diethyl ether or tetrahydrofuran, $H_2O$, alcohols $(R^{16})OH$ such as methanol or ethanol, pyridine, pyridine derivatives of the formula $C_5H_{5-x}(R^{16})_xN$, such as 2-picoline, 3-picoline, 4-picoline, 2,3-lutidine, 2,4-lutidine, 2,5-lutidine, 2,6-lutidine or 3,5-lutidine, CO, $C_1$-$C_{12}$ alkylnitriles or $C_6$-$C_{14}$ arylnitriles are also suitable, such as acetonitrile, propionitrile, butyronitrile or benzonitrile. Furthermore, mono- or polyethylenically unsaturated double bond systems may serve as ligands, such as ethenyl, propenyl, cis-2-butenyl, trans-2-butenyl, cyclohexenyl or norbornenyl, $L^2$ is selected from halide ions, such as fluoride, chloride, bromide or iodide, preferably chloride or bromide, amide ions $(R^{16})_hNH_{2-h}$.A, h denoting an integer between 0 and 2, $C_1$-$C_6$ alkyl anions such as $Me^-$, $(C_2H_5)^-$, $(C_3H_7)^-$, $(n-C_4H_9)^-$, $(tert-C_4H_9)^-$ or $(C_6H_{13})^-$, allyl anions or methallyl anions, benzyl anions or aryl-anions, such as $(C_6H_5)^-$.

In one particular embodiment $L^1$ and $L^2$ are linked to one another by one or more covalent bonds. Examples of such ligands are 1,5-cyclooctadienyl ligands ("COD"), cyclooct-1-en-4-yl, 1,6-cyclodecenyl ligands or 1,5,9-all-trans-cyclododecatrienyl ligands.

In another particular embodiment $L^1$ is tetramethylethylenediamine, in which case only one nitrogen coordinates with the metal.

X denotes radicals of the formula CR or a nitrogen atom (N), in particular radicals of the formula CR, where R is hydrogen,
$C_1$-$C_6$ alkyl groups,
$C_7$-$C_{13}$ aralkyl radicals or
$C_6$-$C_{14}$ aryl groups, unsubstituted or substituted by one or more $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ or $C_1$-$C_{12}$ thioether groups.

Examples of particularly preferred radicals R in the formula CR can be found in connection with the description of the radicals $R^1$ to $R^9$.

Y is an OH group, oxygen, sulfur, N—$R^{10}$ or P—$R^{10}$, particular preference being given to the OH group and to oxygen.

N is a nitrogen atom.

The radicals $R^1$ to $R^9$ are selected independently of one another from
hydrogen,
$C_1$-$C_{12}$ alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, and n-dodecyl; preferably $C_1$-$C_6$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, with particular preference $C_1$-$C_4$ alkyl, such as methyl, ethyl, n-propyl, isopropyl, n-butyl, isobutyl, sec-butyl and tert-butyl, $C_1$-$C_{12}$ alkyl substituted one or more times by identical or different substituents selected from $C_1$-$C_{12}$ alkyl groups, halogens, such as fluorine, chlorine, bromine and iodine, preferably chlorine and bromine, and $C_1$-$C_{12}$ alkoxy groups or $C_1$-$C_{12}$ thioether groups, the alkyl groups of these two groups being defined below, $C_7$-$C_{13}$ aralkyl, such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, with particular preference benzyl, $C_3$-$C_{12}$ cycloalkyl, such as cyclopropyl, cyclobutyl, cyclopentyl, cyclohexyl, cycloheptyl, cyclooctyl, cyclononyl, cyclodecyl, cycloundecyl and cyclododecyl, preferably cyclopentyl, cyclohexyl and cycloheptyl, $C_3$-$C_{12}$ cycloalkyl substituted one or more times by identical or different substituents selected from $C_1$-$C_{12}$ alkyl groups, halogens, $C_1$-$C_{12}$ alkoxy groups, and $C_1$-$C_{12}$ thioether groups, such as 2-methylcyclopentyl, 3-methylcyclopentyl, cis-2,4-dimethylcyclopentyl, trans-2,4-dimethylcyclopentyl 2,2,4,4-tetramethylcyclopentyl, 2-methylcyclohexyl, 3-methylcyclohexyl, 4-methylcyclohexyl, cis-2,5-dimethylcyclohexyl, trans-2,5-dimethylcyclohexyl, 2,2,5,5-tetramethylcyclohexyl, 2-methoxycyclopentyl, 2-methoxycyclohexyl, 3-methoxycyclopentyl, 3-methoxycyclohexyl, 2-chlorocyclopentyl, 3-chlorocyclopentyl, 2,4-dichlorocyclopentyl, 2,2,4,4-tetrachlorocyclopentyl, 2-chlorocyclohexyl, 3-chlorocyclohexyl, 4-chlorocyclohexyl, 2,5-dichlorocyclohexyl, 2,2,5,5-tetrachlorocyclohexyl, 2-thiomethylcyclopentyl, 2-thiomethylcyclohexyl, 3-thiomethylcyclopentyl, 3-thiomethylcyclohexyl, and further derivatives, $C_6$-$C_{14}$ aryl, such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, substituted in turn by one or more $C_1$-$C_{12}$ alkyl groups, as defined above, halogens, as defined above, mono- or polyhalogenated $C_1$-$C_{12}$ alkyl groups, such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, preferably fluoromethyl, difluoromethyl, trifluoromethyl and perfluorobutyl, $C_1$-$C_{12}$ alkoxy groups, preferably $C_1$-$C_6$ alkoxy groups, such as methoxy, ethoxy, n-propoxy, isopropoxy, n-butoxy, isobutoxy, sec-butoxy, tert-butoxy, n-pentoxy, isopentoxy, n-hexoxy and isohexoxy, with particular preference methoxy, ethoxy, n-propoxy and n-butoxy, silyloxy groups OSi$R^{11}R^{12}R^{13}$, $R^{11}$ to $R^{13}$ independently of one another being hydrogen, $C_1$-$C_{20}$ alkyl groups, which may in turn be substituted by O($C_1$-$C_6$ alkyl) or N($C_1$-$C_6$ alkyl)$_2$ groups, $C_3$-$C_{12}$ cycloalkyl groups, $C_7$-$C_{13}$ aralkyl radicals or $C_6$-$C_{14}$ aryl groups, such as the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group, amino groups NR$^{14}$R$^{15}$, R$^{14}$ and R$^{15}$ independently of one another being hydrogen, $C_1$-$C_{20}$ alkyl groups, which may be substituted in turn by O($C_1$-$C_6$ alkyl) or N($C_1$-$C_6$ alkyl)$_2$ groups, $C_3$-$C_{12}$ cycloalkyl groups, $C_7$-$C_{13}$ aralkyl radicals or $C_6$-$C_{14}$ aryl groups, it being possible for R$^{14}$ and R$^{15}$ to form a saturated or unsaturated 5- to 8-membered ring, such as dimethylamino, diethylamino, diisopropylamino, methylphenylamino, diphenylamino, N-piperidyl, N-pyrrolidinyl, N-pyrryl, N-indolyl or N-carbazolyl; or $C_1$-$C_{12}$ thioether groups, as defined above, $C_1$$C_{12}$ alkoxy groups, as defined above, preferably $C_1$-$C_6$ alkoxy groups, such as methoxy, ethoxy, n-propoxy, isopropoxy, n-butoxy, isobutoxy, sec-butoxy, tert-butoxy, n-pentoxy, isopentoxy, n-hexoxy and isohexoxy, with particular preference methoxy, ethoxy, n-propoxy and n-butoxy, silyloxy groups OSi$R^{11}R^{12}R^{13}$, as defined above, halogens, as defined above, or amino groups NR$^{14}$R$^{15}$, as defined above, or NO$_2$ groups, it being possible in each case for two adjacent radicals R$^1$ to R$^9$ to form with one another a saturated or unsaturated 5- to 8-membered ring which is aromatic or aliphatic, such as —(CH$_2$)$_3$— (trimethylene), —(CH$_2$)$_4$— (tetramethylene), —(CH$_2$)$_5$— (pentamethylene), —(CH$_2$)$_6$— (hexamethylene), —CH$_2$—CH=CH—, —CH$_2$—CH=CH—CH$_2$—, —CH=CH—CH=CH—, —O—CH$_2$—O—, —O—CHMe-O—, —CH—(C$_6$H$_5$)—O—, —O—CH$_2$—CH$_2$—O—, —O—CMe$_2$—O—, —NMe-CH$_2$—CH$_2$—NMe-, —NMe-CH$_2$—NMe- or —O—SiMe$_2$—O—.

R$^{10}$ to R$^{16}$ independently of one another are:

hydrogen, $C_1$-$C_{20}$ alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-octyl, n-nonyl, isononyl, n-decyl, isodecyl, n-undecyl, isoundecyl, n-dodecyl, isododecyl, n-tetradecyl, n-hexadecyl, n-octadecyl and n-eicosyl; with particular preference $C_1$-$C_4$ alkyl such as methyl, ethyl, n-propyl, isopropyl, n-butyl, isobutyl, sec-butyl and tert-butyl, $C_1$-$C_{20}$ alkyl groups substituted by O($C_1$-$C_6$ alkyl) or N($C_1$-$C_6$ alkyl)$_2$ radicals, such as CH$_2$—CH$_2$—OCH$_3$ or CH$_2$—CH$_2$—N(CH$_3$)$_2$, $C_3$-$C_{12}$ cycloalkyl, as defined above, $C_7$-$C_{13}$ aralkyl radicals; as defined above, $C_6$-$C_{14}$ aryl groups, as defined above, it being possible in each case for two adjacent radicals R$^{10}$ to R$^{15}$ together with the relevant heteroatom to form a saturated or unsaturated aliphatic or aromatic 5- to 8-membered ring.

In the metal complex compounds of the formula I for use in accordance with the invention, additionally, at least one of the radicals R$^1$ to R$^9$ is necessarily in the form of a radical of the formula II below

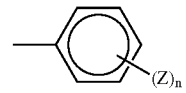

II where Z is an electron-withdrawing group and n is an integer from 1 to 5. One feature of particularly preferred aromatic radicals of the formula II is that Z is NO$_2$, SO$_3$, F, $C_mF_{2m+1}$ where m is an integer from 1 to 10, or a mono- or polyfluorinated aryl.

Metal complex compounds whose use is especially preferred contain the CF$_3$ radical as an electron-withdrawing group and have n equal to 2 or 3. Examples thereof include 3,5-bis(trifluoromethyl)phenyl, 2,6-bis(trifluoromethyl)phenyl, and 2,4,6-tris(trifluoromethyl)phenyl.

The synthesis of the complexes of the formula I is known per se. The complexes of the formula I can be synthesized in analogy to the teachings of the documents EP-A 46331, EP-A 46328 and EP-A 52929 and also WO 98/30609 and WO 98/42664 and in the publication by C. Wang et al., *Organometallics* 1998, 17, 3149ff.

One preferred synthesis route for introducing the radicals of the formula II into the ligands or ligand precursors is that known as Suzuki coupling. It is preferred to use boric acid containing a radical of the formula II instead of an OH function.

Preference is given to using electrically neutral nickel complex compounds.

The total amount of metal complex compound used is generally from $10^{-7}$ to $10^{-2}$ mol/l, frequently from $10^{-5}$ to $10^{-3}$ mol/l, and often from $10^{-5}$ to $10^{-4}$ mol/l, based in each case on the total amount of water, olefinically unsaturated compounds, and, where appropriate, organic solvents.

Metal complex compounds of the formula I which can be used with particular advantage are those whose ligands are derived from the derivatives of salicylaldimine. Preference is given, inter alia, to the following representatives of the formulae $I_1$ to $I_4$

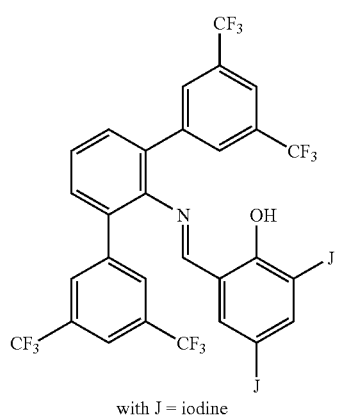

with J = iodine

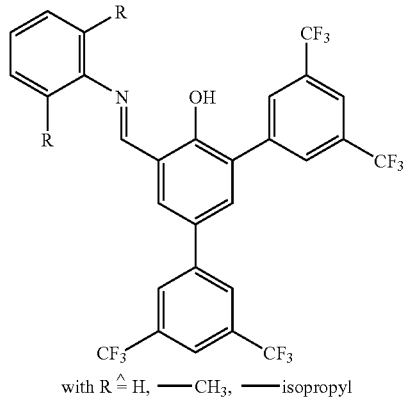

with R $\stackrel{\triangle}{=}$ —H, —CH$_3$, —isopropyl

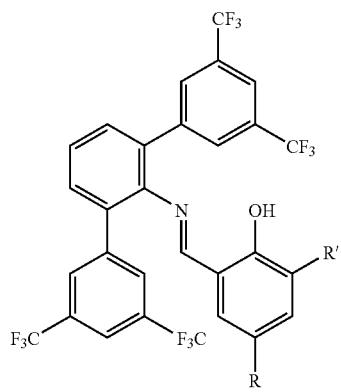

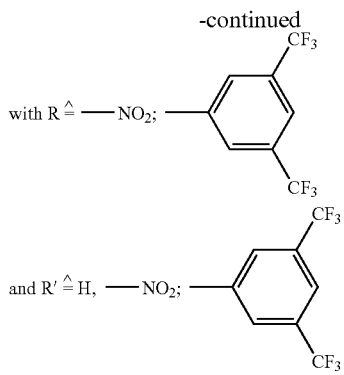

with R $\stackrel{\triangle}{=}$ —NO$_2$;

and R' $\stackrel{\triangle}{=}$ H, —NO$_2$;

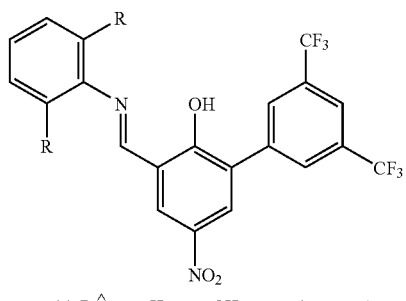

with R $\stackrel{\triangle}{=}$ —H, —CH$_3$, —isopropyl

The metal complex compounds of the formula I to be used in accordance with the invention may be used either by isolating them only after the reaction of the ligands with the metal compound and then introducing them into the polymerization system or else in the form of what is called an in situ system, in which case the metal complex compound is not isolated.

The aforementioned metal complexes can also be used in combination with an activator. Possible activators include, in particular, olefin complexes of rhodium or of nickel.

Preferred and readily available activators include nickel (olefin)$_y$ complexes, such as Ni(C$_2$H$_4$)$_3$, Ni(1,5-cyclooctadiene)$_2$ "Ni(COD)$_2$", Ni(1,6-cyclodecadiene)$_2$, or Ni(1,5,9-all-trans-cyclododecatriene)$_2$. Particular preference is given to Ni(COD)$_2$.

Likewise suitable are mixed ethylene/1,3-dicarbonyl complexes of rhodium, such as rhodium acetylacetonate-ethylene Rh(acac)(CH$_2$=CH$_2$)$_2$, rhodium benzoylacetonate-ethylene Rh(C$_6$H$_5$—CO—CH—CO—CH$_3$) (CH$_2$=CH$_2$)$_2$ or Rh(C$_6$H$_5$—CO—CH—CO—C$_6$H$_5$) (CH$_2$=CH$_2$)$_2$. Rh(acac)(CH$_2$=CH$_2$)$_2$ is very suitable. This compound can be synthesized in accordance with R. Cramer, *Inorg. Synth.* 1974, 15, 14ff.

The molar ratio of activator to metal complexes is generally in the range from 0.1 to 10, frequently from 0.2 to 5, and often from 0.5 to 2.

The dispersants likewise used in accordance with the process of the invention may be emulsifiers or protective colloids.

Examples of suitable protective colloids include polyvinyl alcohols, polyalkylene glycols, alkali metal salts of polyacrylic acids and polymethacrylic acids, gelatin derivatives, or acrylic acid, methacrylic acid, maleic anhydride, 2-acrylamido-2-methylpropanesulfonic acid and/or 4-styrene-sulfonic acid copolymers and their alkali metal salts, and also N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-bearing acrylate, methacrylate, acrylamide and/or methacrylamide homopolymers and copolymers. A detailed description of further suitable protective colloids can be found in Houben-Weyl, Methoden der organischen Chemie, Volume XIV/1, Makromolekulare Stoffe, Georg-Thieme-Verlag, Stuttgart, 1961, pages 411 to 420.

It is of course also possible to use mixtures of emulsifiers and/or protective colloids. As dispersants it is common to use exclusively emulsifiers, whose relative molecular weights, unlike those of protective colloids, are usually below 1 000. They may be anionic, cationic or nonionic in nature. Where mixtures of surface-active substances are used it is of course necessary that the individual components be compatible with one another, something which in case of doubt can be checked by means of a few preliminary tests. Generally speaking, anionic emulsifiers are compatible with one another and with nonionic emulsifiers. The same applies to cationic emulsifiers, whereas anionic and cationic emulsifiers are usually not compatible with one another. An overview of suitable emulsifiers can be found in Houben-Weyl, Methoden der organischen Chemie, Volume XIV/1, Makromolekulare Stoffe, Georg-Thieme-Verlag, Stuttgart, 1961, pages 192 to 208.

In accordance with the invention the dispersants used are, in particular, anionic, cationic and/or nonionic emulsifiers, preferably anionic and/or nonionic emulsifiers.

Examples of common nonionic emulsifiers include ethoxylated mono-, di-, and trialkylphenols (EO units: 3 to 50, alkyl: $C_4$ to $C_{12}$) and also ethoxylated fatty alcohols (EO units: 3 to 80; alkyl: $C_8$ to $C_{36}$). Examples thereof are the Lutensol® A grades ($C_{12}C_{14}$ fatty alcohol ethoxylates, EO units: from 3 to 8), Lutensol® AO grades ($C_{13}C_{15}$ oxo alcohol ethoxylates, EO units: 3 to 30), Lutensol® AT grades ($C_{16}C_{18}$ fatty alcohol ethoxylates, EO units: 11 to 80), Lutensol® ON grades ($C_{10}$ oxo alcohol ethoxylates, EO units: 3 to 11) and the Lutensol® TO grades ($C_{13}$ oxo alcohol ethoxylates, EO units: 3 to 20), all from BASF AG.

Examples of customary anionic emulsifiers include alkali metal and ammonium salts of alkyl sulfates (alkyl: $C_8$ to $C_{16}$), of sulfuric monoesters with ethoxylated alkanols (EO units: 4 to 30, alkyl: $C_{12}$ to $C_{18}$) and with ethoxylated alkylphenols (EO units: 3 to 50, alkyl: $C_4$ to $C_{12}$), of alkylsulfonic acids (alkyl: $C_{12}$ to $C_{18}$), and of alkylarylsulfonic acids (alkyl: $C_9$ to $C_{18}$).

Compounds which have proven to be further anionic emulsifiers, additionally, are those of the formula III

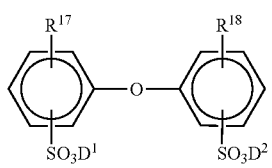

III in which $R^{17}$ and $R^{18}$ denote hydrogen atoms or $C_4$ to $C_{24}$ alkyl but are not simultaneously hydrogen atoms, and $D^1$ and $D^2$ can be alkali metal ions and/or ammonium ions. In the formula III, $R^{17}$ and $R^{18}$ preferably denote linear or branched alkyl radicals having from 6 to 18 carbon atoms, in particular 6, 12 or 16 carbon atoms, or hydrogen, $R^{17}$ and $R^{18}$ not simultaneously being hydrogen atoms. $D^1$ and $D^2$ are preferably sodium, potassium or ammonium, sodium being particularly preferred. Particularly advantageous compounds III are those in which $D^1$ and $D^2$ are sodium, $R^{17}$ is a branched alkyl radical of 12 carbon atoms and $R^{18}$ is a hydrogen atom or $R^{17}$. Use is frequently made of technical-grade mixtures which include a fraction of 50 to 90% by weight of the monoalkylated product, such as, for example, Dowfax® 2A1 (brand name of the Dow Chemical Company). The compounds III are general knowledge, for example, from U.S. Pat. No. 4,269,749, and are available commercially.

Suitable cationic emulsifiers are generally $C_6$ to $C_{18}$-alkyl, -aralkyl or -heterocyclyl-containing primary, secondary, tertiary or quaternary ammonium salts, alkanolammonium salts, pyridinium salts, imidazolinium salts, oxazolinium salts, morpholinium salts, thiazolinium salts, and also salts of amine oxides, quinolinium salts, isoquinolinium salts, tropylium salts, sulfonium salts and phosphonium salts. Mention may be made, by way of example, of dodecylammonium acetate or the corresponding sulfate, the sulfates or acetates of the various 2-(N,N,N-trimethylammonium)ethylparaffinic esters, N-cetylpyridinium sulfate, N-laurylpyridinium sulfate, and also N-cetyl-N,N,N-trimethylammonium sulfate, N-dodecyl-N,N,N-trimethylammonium sulfate, N-octyl-N,N,N-trimethylammonium sulfate, N,N-distearyl-N,N-dimethylammonium sulfate, and the gemini surfactant N,N'-(lauryldimethyl)ethylenediamine disulfate, ethoxylated tallow fatty alkyl-N-methylammonium sulfate and ethoxylated oleylamine (for example, Uniperol® AC from BASF AG; about 12 ethylene oxide units). Numerous further examples can be found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. It is important that the anionic countergroups are of very low nucleophilicity, such as perchlorate, sulfate, phosphate, and nitrate, for example, and carboxylates, such as acetate, trifluoroacetate, trichloroacetate, propionate, oxalate, citrate, and benzoate, for example, and also conjugated anions of organic sulfonic acids, such as methylsulfonate, trifluoromethylsulfonate, and para-toluenesulfonate, for example, and additionally tetrafluoroborate, tetraphenylborate, tetrakis(pentafluorophenyl)borate, tetrakis[3,5-bis (trifluoromethyl)phenyl]borate, hexafluorophosphate, hexafluoroarsenate or hexafluoroantimonate.

The emulsifiers used with preference as dispersants are employed advantageously in a total amount of 0.005 to 10 parts by weight, preferably 0.01 to 7 parts by weight, in particular 0.1 to 5 parts by weight, based in each case on 100 parts by weight of water. Depending on the polymerization system it is also possible to select the amount of emulsifiers so that their critical micelle concentration in water is not exceeded.

The total amount of the protective colloids used additionally or instead as dispersants is often 0.1 to 10 parts by weight and frequently 0.2 to 7 parts by weight, based in each case on 100 parts by weight of water.

In accordance with the invention it is also possible, optionally, to use organic solvents of low solubility in water. Suitable solvents are liquid aliphatic and aromatic hydrocarbons having 5 to 30 carbon atoms, such as n-pentane and isomers, cyclopentane, n-hexane and isomers, cyclohexane, n-heptane and isomers, n-octane and isomers, n-nonane and isomers, n-decane and isomers, n-dodecane and isomers, n-tetradecane and isomers, n-hexadecane and isomers, n-octadecane and isomers, eicosane, benzene, toluene, ethylbenzene, cumene, o-, m- or p-xylene, mesitylene, and also, generally, hydrocarbon mixtures boiling in the range from 30 to 250° C. It is likewise possible to use hydroxy compounds, such as saturated and unsaturated fatty alcohols having 10 to 28 carbon atoms, examples being n-dodecanol, n-tetradecanol, n-hexadecanol and their isomers or cetyl alcohol, esters, such as fatty acid esters having from 10 to 28 carbon atoms in the acid moiety and 1 to 10 carbon atoms in the alcohol moiety or esters of carboxylic acids and fatty alcohols having 1 to 10 carbon atoms in the carboxylic acid moiety and 10 to 28 carbon atoms in the alcohol moiety. It is of course also possible to use mixtures of aforementioned solvents.

The total amount of solvent is up to 15 parts by weight, preferably 0.001 to 10 parts by weight, and with particular preference 0.01 to 5 parts by weight, based in each case on 100 parts by weight of water.

It is advantageous if the solubility of the solvent or solvent mixture under reaction conditions in the aqueous reaction medium is as far as possible $\leq 50\%$ by weight, $\leq 40\%$ by weight, $\leq 30\%$ by weight, $\leq 20\%$ by weight or $\leq 10\%$ by weight, based in each case on the total solvent amount.

Solvents are used especially when the olefinically unsaturated compounds are gaseous under reaction conditions (pressure/temperature), as is the case, for example, with ethene, propene, 1-butene and/or isobutene.

The process of the invention can be carried out by dissolving, in a first step, the total amount of the metal complexes, i.e., of the metal complex compound of the formula I and also of the activators (used optionally), in a portion or the entirety of the olefins and/or of the organic solvents of low solubility in water. This solution is then dispersed together with the dispersants in an aqueous medium with the formation of oil-in-water dispersions having an average droplet diameter$\geq 1\,000$ nm, referred to as macroemulsions. These macroemulsions are then converted by known measures into oil-in-water emulsions having an average droplet diameter$\leq 1\,000$ nm, referred to as miniemulsions, which are admixed at reaction temperature with any remaining portion or entirety of the compounds and/or of the organic solvents of low solubility in water.

The average size of the droplets of the disperse phase of the aqueous oil-in-water emulsions can be determined in accordance with the principle of quasielastic dynamic light scattering (the z-average droplet diameter $d_z$ of the unimodal analysis of the autocorrelation function), using for example a Coulter N4 Plus Particle Analyser from Coulter Scientific Instruments. The measurements are made at 25° C. under atmospheric pressure on dilute aqueous miniemulsions with a nonaqueous constituent content of 0.01% by weight. Dilution in this case is performed by means of water, which beforehand has been saturated with the olefins and/or low-water-solubility organic solvents present in the aqueous emulsion. The latter measure is intended to prevent any change in the droplet diameters on dilution.

The $d_z$ figures found in this way for the miniemulsions are normally $\leq 700$ nm, frequently $\leq 500$ nm. A favorable $d_z$ range in accordance with the invention is from 100 nm to 400 nm or from 100 nm to 300 nm. Normally, $d_z$ for an aqueous miniemulsion is $\geq 40$ nm.

The general preparation of aqueous miniemulsions from aqueous macroemulsions is known to the skilled worker (cf. P. L. Tang, E. D. Sudol, C. A. Silebi, and M. S. El-Aasser in Journal of Applied Polymer Science, 43 [1991] 1059-1066).

For this purpose it is possible, for example, to employ high-pressure homogenizers. In these machines, the fine distribution of the components is achieved by means of a high local energy input. Two variants have proven particularly appropriate in this respect.

In the first variant, the aqueous macroemulsion is compressed to more than 1 000 bar by means of a piston pump and is then released through a narrow slot. The effect here is based on an interplay of high shear gradients and pressure gradients and cavitation in the slot. One example of a high-pressure homogenizer which functions in accordance with this principle is the Niro-Soavi high-pressure homogenizer type NS1001L Panda.

In the second variant, the compressed aqueous macroemulsion is released into a mixing chamber through two nozzles directed against one another. In this case, the fine distribution effect is dependent in particular on the hydrodynamic conditions prevailing within the mixing chamber. An example of this type of homogenizer is the Microfluidizer type M 120 E from Microfluidics Corp. In this high-pressure homogenizer, the aqueous macroemulsion is compressed to pressures of up to 1 200 bar by a pneumatically operated piston pump and is released via what is called an "interaction chamber". Within the "interaction chamber" the emulsion jet is divided, in a microchannel system, into two jets which are collided at an angle of 180°. Another example of a homogenizer which operates in accordance with this type of homogenization is the Nanojet type Expo from Nanojet Engineering GmbH. In the Nanojet, however, instead of a fixed channel system, two homogenizing valves are installed which can be adjusted mechanically.

As an alternative to the principles set out above, homogenization may also be effected, for example, using ultrasound (e.g. Branson Sonifier II 450). The fine distribution here is based on cavitation mechanisms. For homogenization by means of ultrasound, the devices described in GB-A 22 50 930 and U.S. Pat. No. 5,108,654 are also suitable in principle. The quality of the aqueous miniemulsion produced in the sonic field depends in this case not only on the sonic input but also on other factors too, such as the intensity distribution of the ultrasound in the mixing chamber, the residence time, the temperature, and the physical properties of the substances to be emulsified—for example, the viscosity, surface tension, and vapor pressure. The resulting droplet size depends, inter alia, on the concentration of the emulsifier and on the energy introduced during homogenization, and can therefore be adjusted purposively by, for example, altering the homogenization pressure or the corresponding ultrasound energy accordingly.

For the preparation of an aqueous miniemulsion from conventional macroemulsions by means of ultrasound, the device described in the prior German patent application DE 197 56 874 has proven particularly suitable. This is a device which has a reaction chamber or flow-traversed reaction channel and at least one means for transferring ultrasound waves to the reaction chamber or flow-traversed reaction channel, the means for transferring ultrasound waves being designed so that the entire reaction chamber or reaction channel can be uniformly irradiated with ultrasound waves in one subsection. For this purpose, the emitting surface of the means for transferring ultrasound waves is designed so that it corresponds essentially to the surface area of the reaction chamber or, if the reaction chamber is a subsection of a flow-traversed reaction channel, so that it extends essentially over the entire width of the channel, and so that the depth of the reaction chamber, which is substantially vertical with respect to the emitting surface, is smaller than the maximum depth of action of the ultrasound transfer means.

By "depth of the reaction chamber" in this case is meant essentially the distance between the emitting area of the ultrasound transfer means and the base of the reaction chamber.

Preference is given to reaction chamber depths of up to 100 mm. Advantageously, the depth of the reaction chamber should not be more than 70 mm and with particular advantage should not be more than 50 mm. The reaction chambers may in principle also have a very small depth, but in view of a minimized clogging risk and ease of cleaning, and a high product throughput, preference is given to reaction chamber depths which are substantially larger than, for example, the customary slot heights in high-pressure homogenizers, and are usually more than 10 mm. Advantageously, it is possible to alter the depth of the reaction chamber, for example, by means of ultrasound transfer means which protrude into the housing to different depths.

In accordance with a first embodiment of this device, the emitting area of the means for transferring ultrasound corresponds essentially to the surface area of the reaction chamber. This embodiment serves for batchwise preparation of the miniemulsions used in accordance with the invention. With this device, ultrasound is able to act on the entire reaction chamber. In the reaction chamber, the axial sonic radiation pressure produces a turbulent flow which brings about intensive cross-mixing.

In accordance with a second embodiment, a device of this kind has a flow-traversed cell. In this case the housing is designed as a flow-traversed reaction channel, having an inflow and an outflow, the reaction chamber being a subsection of the flow-traversed reaction channel. The width of the channel is the extent of the channel which extends substantially perpendicular to the direction of flow. In this device the emitting area covers the entire width of the flow channel transverse to the flow direction. The length of the emitting area that is perpendicular to this width, in other words the length of the emitting area in the flow direction, defines the range of action of the ultrasound. In one advantageous variant of this second embodiment, the flow-traversed reaction channel has a substantially rectangular cross section. If a likewise rectangular ultrasound transfer means of appropriate dimensions is installed in one side of the rectangle, particularly effective uniform sonication is ensured. Owing to the turbulent flow conditions which prevail in the ultrasound field, however, it is also possible, for example, to use a circular transfer means with no disadvantages. Furthermore, instead of a single ultrasound transfer means, it is possible to dispose two or more separate transfer means which lie behind one another as viewed in the flow direction. In that case both the emitting areas and also the depth of the reaction chamber, i.e., the distance between the emitting area and the base of the flow-traversed channel, may vary.

With particular advantage the means for transferring ultrasound waves is designed as a sonotrode whose end remote from the free emitting area is coupled to an ultrasound transducer. The ultrasound waves may be produced, for example, by exploiting the inverse piezoelectric effect. In this case generators are used to generate high-frequency electrical oscillations (usually in the range from 10 to 100 kHz, preferably between 20 and 40 kHz), and these are converted by a piezoelectric transducer into mechanical vibrations of the same frequency and, with the sonotrode as transfer element, are coupled into the medium that is to be sonicated.

With particular preference, the sonotrode is designed as a rod-shaped, axially emitting $\lambda/2$ (or multiples of $\lambda/2$) longitudinal oscillator. A sonotrode of this kind may be fastened in an aperture of the housing by means, for example, of a flange provided at one of its nodes of oscillation. In this way the entry point of the sonotrode into the housing can be given a pressuretight design, so that the reaction chamber can be sonicated even under superatmospheric pressure. Preferably, the amplitude of oscillation of the sonotrode can be regulated, i.e., the particular oscillation amplitude set is monitored on line and, where necessary, is corrected automatically. The current amplitude of oscillation can be monitored, for example, by means of a piezoelectric transducer mounted on the sonotrode, or by means of a strain gage with downstream evaluation electronics.

In accordance with a further advantageous design of such devices, the reaction chamber contains internals for improving the flow behavior and mixing behavior. These internals may comprise, for example, simple deflector plates or a wide variety of porous structures.

If required, mixing may further be made more intensive by means of an additional stirring unit. It is advantageous for the reaction chamber to be temperature-controllable.

One embodiment of the process of the invention is such, for example, that the total amounts of the metal complex and of any activators added are dissolved in a portion or the entirety of the organic solvents of low solubility in water. This organic metal complex solution is then dispersed, together with a portion or the entirety of the dispersants, in water to form a macroemulsion. By means of one of the aforementioned homogenizing apparatus the macroemulsion is converted into a miniemulsion. The total amount of the olefins and any remaining amounts of organic solvents or dispersants are metered into this miniemulsion at reaction temperature and with continual stirring. This process variant is chosen in particular when the olefins used are gaseous under reaction conditions, as is the case, for example, with ethene, propene, 1-butene and/or isobutene.

In a further embodiment the total amounts of the metal complex and of any activators added are dissolved in a portion or the entirety of the olefins. This organic metal complex solution is then dispersed, together with a portion or the entirety of the dispersants, in water to form a macroemulsion. By means of one of aforementioned homogenizing apparatus the macroemulsion is converted into a miniemulsion. Any remaining amounts of olefins or dispersants and also, where appropriate, the total amount of the organic solvents of low solubility in water, are metered into this miniemulsion at reaction temperature and with continual stirring. This process variant is chosen in particular when the olefinically unsaturated compounds used are liquid under reaction conditions, as is the case, for example, with 1-pentene, cyclopentene, 1-hexene, cyclohexene, 1-octene, 1-decene, 1-dodecene, 1-tetradecene and/or 1-hexadecene.

It is significant that the liquid droplets having a diameter $\leq 1\,000$ nm which are present in the form of a separate phase in the aqueous medium may contain not only the aforementioned compounds, i.e., the metal complex compounds, the activators where appropriate, and the solvent, and also the olefins, but also further components. Examples of further components include formulating assistants, antioxidants, light stabilizers, and also dyes, pigments and/or waxes for water repellency. If the solubility of the further components in the organic phase making up the droplets is greater than in the aqueous medium, then these remain in the droplets during the polymerization reaction. Since the droplets which contain the metal complexes and are formed from olefins and/or solvents of low solubility in water ultimately constitute the sites of the polymerization, the polymer particles formed generally contain these additional components in copolymerized form.

The polymerization itself normally takes place at a minimum pressure of 1 bar; below this pressure, the polymerization rate is too low. Preference is given to 2 bar, and particular preference to a minimum pressure of 10 bar.

4 000 bar may be stated as a-maximum pressure; at higher pressures, the requirements imposed on the material of which the polymerization reactor is made are very high, and the operation becomes uneconomic. Preference is given to $\leq 100$ bar and particular preference to $\leq 50$ bar.

The polymerization temperature can be varied within a wide range. 10° C. may be stated as a minimum temperature, since at low temperatures the polymerization rate falls. Preference is given to a minimum temperature of 20° C. and with particular preference 30° C. The maximum rational temperature may be stated as being 350° C. and preferably 150° C., with 100° C. being particularly preferred.

The number-average diameters of the polymer particles in the dispersions of the invention are between 10 and 3 000 nm, preferably between 50 and 500 nm, and with particular preference between 70 and 350 nm (quasielastic light scattering; ISO Standard 13321). The distribution of the particle diameters is generally narrow and monomodal.

The particle diameters can be determined by standard methods. An overview of these methods is given, for example, in D. Distler (Editor) "Wäβrige Polymerdispersionen", Wiley-VCH Verlag, 1st Edition, 1999, Chapter 4.

The weight-average molecular weights $M_w$, determined by means of gel permeation chromatography using polymethyl methacrylate as standard, of the polymers obtainable in accordance with the invention are generally in the range from 10 000 to 10 000 000, frequently in the range from 15 000 to 1 000 000, and often in the range from 20 000 to 1 000 000. The molecular weight distribution D (where $D=M_w/M_n$) is generally narrow, with D values of $\leq 4$, $\leq 3$, but also $\leq 2.5$ or even $\leq 2$.

By targeted variation of the olefinically unsaturated compounds it is possible in accordance with the invention to prepare copolymers whose glass transition temperature or melting point is situated in the range from −60 to +270° C.

By the glass transition temperature $T_g$ is meant the limiting value of the glass transition temperature toward which said temperature tends with increasing molecular weight according to G. Kanig (Kolloid-Zeitschrift & Zeitschrift für Polymere, Vol. 190, page 1, equation 1). The glass transition temperature is determined by the DSC method (Differential Scanning Calorimetry, 20 K/min, midpoint measurement, DIN 53765).

According to Fox (T. G. Fox, Bull. Am. Phys. Soc. 1956 [Ser. II] 1, page 123 and according to Ullmann's Encyclopädie der technischen Chemie, Vol. 19, page 18, 4th Edition, Verlag Chemie, Weinheim, 1980) the glass transition temperature of copolymers with no more than low levels of crosslinking is given in good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, … n and $T_g^1, T_g^2, \ldots T_g^n$ are the glass transition temperatures of the polymers constructed in each case from only one of the monomers 1, 2, … n, in degrees Kelvin. The $T_g$ values for the homopolymers of the majority of monomers are known and are listed, for example, in Ullmann's Encyclopedia of Industrial Chemistry, Vol. A21, page 169, 5th Edition, VCH Weinheim, 1992; further sources of homopolymer glass transition temperatures include, for example, J. Brandrup, E. H. Immergut, Polymer Handbook, 1$^{st}$ Ed., J. Wiley, New York 1966, 2$^{nd}$ Ed. J. Wiley, New York 1975, and 3$^{rd}$ Ed. J. Wiley, New York 1989.

The polymer dispersions of the invention frequently have minimum film formation temperatures MFFT$\leq$80° C., often $\leq$50° C. or $\leq$30° C. Since it is no longer possible to measure the MFFT below 0° C., the lower limit of the MFFT can only be indicated by the $T_g$ values. The MFFT is determined in accordance with DIN 53787.

By means of the process of the invention it is possible to obtain aqueous copolymer dispersions whose solids content is 0.1 to 70% by weight, frequently 1 to 65% by weight, and often 5 to 60% by weight, and all values in between.

Naturally, the residual monomers left in the aqueous polymer system after the end of the main polymerization reaction can be removed by means of steam stripping and/or inert gas stripping, familiar to the skilled worker, without detriment to the properties of the polymers present in the aqueous medium.

The aqueous polymer dispersions obtainable in accordance with the invention are frequently stable over several weeks or months, during which time they generally show virtually no phase separation, precipitation phenomena or formation of coagulum whatsoever. The aqueous polymer dispersions obtainable in accordance with the invention can be used with advantage in numerous applications, such as paper applications such as paper coating or surface sizing, and also paints and varnishes, construction chemicals and polymer plasters, adhesive base materials, sealing compounds, molded foams, textile and leather applications, carpet-backing coatings, mattresses or pharmaceutical preparations.

Paper coating is the coating of the paper surface with aqueous pigmented dispersions. The polymer dispersions of the invention are advantageous on account of their favorable price. Surface sizing is the pigment-free application of hydrophobicizing substances. In this case the polyolefin dispersions, as particularly hydrophobic substances, which have to date been difficult to obtain under economic conditions, are of particular advantage. A further advantage is that during the preparation of the dispersions of the invention for paper coating or surface sizing there is no need to add any molar mass regulators such as tert-dodecyl mercaptan, for example, which on the one hand are difficult to separate off and on the other hand have an unpleasant odor.

In paints and varnishes the polymer dispersions obtainable in accordance with the invention are particularly suitable because their pricing is very favorable. Aqueous polyethylene dispersions are especially advantageous because in addition they also have a particular UV stability. Furthermore, aqueous polyethylene dispersions are particularly suitable because they are resistant to basic materials, such as cement, which are common in chemicals for the construction industry.

In adhesives, especially in adhesives for self-adhesive labels or films and also plasters, but also in construction adhesives or industrial adhesives, the dispersions of the invention have economic advantages. In construction adhesives in particular they are especially favorable because they are resistant to basic materials, which are common in chemicals for the construction industry.

In molded foams which are produced from the dispersions of the invention by conventional processes such as the Dunlop process or the Talalay process, the favorable price of the dispersions of the invention is again advantageous. Further components used are gelling agents, soaps, thickeners, and vulcanizing pastes. Molded foams are processed, for example, into mattresses.

Textile and leather applications serve to durabilize and enhance textile or leather. Among the effects, mention may be made by way of example of the impregnation and the further finishing of the textiles. An advantage of the dispersions of the invention as a constituent in textile and leather applications, besides the favorable price, is the absence of odor, since olefins as residual monomers can be removed easily.

Carpet-backing coatings are used to bond the carpet fibers to the backing, and also have the function of giving the carpet the necessary rigidity and of providing uniform distribution of additives such as flame retardants or antistats, for example. An advantage of the dispersions of the invention, besides their favorable price, is their insensitivity to the common additives. In particular, the polyethylene dispersions of the invention have proven to be especially inert chemically. A further advantage is that, during the preparation of the dispersions of the invention for carpet-backing coatings, there is no need to add any molar mass regulators such as tert-dodecyl mercaptan, for example, which on the one hand are difficult to separate off and on the other hand have an unpleasant odor. Finally, carpets containing the carpet-backing coatings of the invention are well suited to recycling.

By pharmaceutical preparations are meant dispersions as vehicles for drugs. Dispersions as vehicles for drugs are known per se. Advantages of the dispersions of the invention as drug vehicles include the economically favorable price and their resistance to physiological influences such as gastric fluid or enzymes.

The process of the invention opens up an economic, environmental, and preparatively simple route, with substantially no safety concerns, to aqueous polymer dispersions of inexpensive olefins. On the basis of their preparation, the aqueous polymer dispersions obtainable in accordance with the invention contain polymer particles containing extremely small amounts, if any, of organic solvents. However, where the process of the invention is carried out in the presence of solvents of low solubility in water, it is possible to prevent any odor nuisance during the formation of polymer films by selecting high-boiling solvents. Moreover, the optionally used solvents frequently act as coalescants and so promote film formation. As a direct feature of the process, the polymer dispersions obtainable in accordance with the invention comprise polymer particles having a narrow, monomodal size distribution. Moreover, even with small amounts of dispersant, the aqueous polymer dispersions obtained are stable for weeks and months and, during this time, generally show virtually no phase separation, precipitation phenomena or formation of coagulum whatsoever. In accordance with the process of the invention it is also possible, furthermore, to obtain aqueous polymer dispersions whose polymer particles, in addition to the polymer, include further additives, such as formulating assistants, antioxidants, light stabilizers, and also dyes, pigments and/or waxes, for example.

Another of the features of the aqueous dispersions which are likewise part of the invention is that they comprise polyolefins having a high molar mass.

EXAMPLES

All reactions were performed under an argon atmosphere. Toluene was distilled over sodium/ether and demineralized water was distilled under argon. In addition, the water was degassed three times. Pyridine and pentane were distilled over KOH.

I. Preparation of 2,6-diphenylaniline 1.10 g (9.0 mmol) of phenylboric acid in 6 ml of ethanol were added to a solution of 0.75 g (3.0 mmol) of 2,6-dibromoaniline in 30 ml of toluene. The resulting mixture was admixed with a 2-molar solution of $Na_2CO_3$ (24 mmol) in water (2 ml). The two-phase mixture obtained was then flushed with argon, after which 0.42 g (0.36 mmol) of $Pd(PPh_3)_4$ was added. The mixture obtained in this way was stirred at 90° C. overnight. The organic phase was then separated from the aqueous phase and the aqueous phase was extracted three times with diethyl ether. The combined organic phases obtained were dried over $Na_2SO_4$. The organic solvent was evaporated off and the compound obtained was purified by column chromatography (over silica gel/with toluene). The compound obtained was then identified as 2,6-diphenylaniline by $^1$H-NMR, $^{13}$C-NMR, mass spectroscopy, and elemental analysis. The yield was 80%.

Similarly, 2,6-bis(3,5-bis(trifluoromethyl)phenyl)aniline was prepared starting from 3,5-bis(trifluoromethyl)phenyl boric acid. The yield of this compound was 80%. It was determined by means of $^1$H-NMR, $^{13}$C-NMR (nuclear magnetic resonance spectroscopy), mass spectroscopy, and elemental analysis.

2,6-bis(3,5-bis(trifluoromethyl)phenyl)aniline: yield 80%. $^1$H-NMR (300 MHz, $CDCl_3$): 8.01 (CH, s, 4H), 7.94 (CH, s, 2H), 7.21 (CHCHCH, d, $^3J_{HH}$=7.5 Hz, 2H), 7.01 (CHCHCH, t, $^3J_{HH}$=7.5 Hz, 1H). $^{13}$C-NMR (75.4 MHz, $CDCl_3$): 141.3 ($CNH_2$, s), 140.4 (Ph, s), 132.4 ($CCF_3$, quartet, $^2J_{CF}$=33 Hz), 131.0 (Ph, s), 129.6 ($CCCF_3$, quartet, $^3J_{CF}$=3 Hz), 125.5 (Ph, s) 123.2 ($CF_3$, quartet, $^1J_{CF}$=273 Hz), 121.5 ($CCCF_3$, septet, $^3J_{CF}$=3 Hz), 119.3 (Ph, s). Elemental analysis: ($C_{22}H_{11}F_2N$) : C, 51.08; H, 2.14; N, 2.71. Found: C, 51.07; H, 1.99; N, 2.65. Mass: 517.3 g/mol$^{-1}$.

II. Preparation of the Corresponding Salicylaldimine Ligand Starting from the Aniline Compound from Section I 5 ml of a methanolic solution of 3,5-diiodo-2-hydroxybenzaldehyde (166 mg; 0.61 mmol) were admixed with a catalytic amount of formic acid and with 2,6-bis(3,5-bis(trifluoromethyl)phenyl)aniline (0.55 mmol). The reaction mixture was then mixed at room temperature for 6 hours. A yellow solid was precipitated, which was first filtered off, then washed with cold methanol and finally dried. The salicylaldimine ligand obtained was determined by means of $^1$H-NMR, $^{13}$C-NMR, mass spectroscopy, and elemental analysis. The yield was 85%.

III. Preparation of the Corresponding Metal Complex Starting from the Ligand from Section II To a solution of 100 mg (0.49 mmol) of $Ni(CH_3)_2$ (TMEDA)—TMEDA stands for tetramethylethylenediamine—in 10 ml of ether there was added 0.49 mmol of the salicylaldimine ligand obtained from section II, at −30° C. In addition, 0.5 ml of pyridine was added to this reaction mixture. The temperature was then raised to 0° C. and the orange-red mixture obtained was stirred for 2 hours. The solvent was then removed under reduced pressure and the residue was washed with cold pentane. The orange-red nickel complex compound was obtained in a yield of more than 90%.

IV. Polymerization of Ethylene Using the Nickel Complex Obtained from Section III A Schlenk tube was filled with a solution of 20 μmol of the nickel complex obtained from section III in 2 ml of toluene and 0.3 ml of hexadecane. The solution thus obtained was then added to a solution of 0.75 g of sodium dodecyl sulfate in 98 ml of water. The mixture obtained was then treated with an ultrasonic homogenizer (120 W, 2 minutes), to give a miniemulsion. The miniemulsion was subsequently transferred to a 150 ml steel autoclave which had been filled with ethylene under a pressure of 40 bar. The temperature in the autoclave was then raised to 50° C. and after 1 hour the autoclave was rapidly cooled and degassed. The aqueous emulsion obtained was filtered through glass wool. It contained an ethylene homopolymer which was identified by recovering it from the emulsion by precipitation with 3 times the amount by volume of acetone.

We claim:
1. A process for preparing an aqueous polymer dispersion, by polymerizing as components, one or more olefins in an aqueous medium in the presence of one or more dispersants, and, optionally, of organic solvents, said components forming a miniemulsion having an average droplet diameter ≦1000 nm, said process comprising catalyzing, in the miniemulsion, the polymerization of said one or more olefins in the presence of one or more metal complex compounds of the formula I:

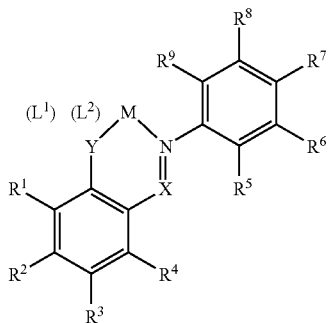

wherein the substituents and indices have the following meanings:

M is a transition metal from groups 7 to 10 of the periodic table of the elements;

$L^1$ is selected from the group consisting of phosphanes $(R^{16})_x PH_{3-x}$ and amines $(R^{16})_x NH_{3-x}$ with identical or different radicals $R^{16}$, ethers $(R^{16})_2 O$, $H_2O$, alcohols $(R^{16})OH$, pyridine, pyridine derivatives of the formula $C_5H_{5-x}(R^{16})_x N$, CO, $C_1$-$C_{12}$ alkylnitriles, $C_6$-$C_{14}$ arylnitriles and ethylenically unsaturated double bond systems, x denoting an integer from 0 to 3;

$L^2$ is selected from the group consisting of halide ions, amide ions $(R^{16})_h NH_{2-h}$, h denoting an integer from 0 to 2, $C_1$-$C_6$ alkyl anions, allyl anions, benzyl anions and aryl anions, and optionally, $L^1$ and $L^2$ may be linked to one another by one or more covalent bonds;

X: is CR or nitrogen (N);

R: is hydrogen,
  $C_1$-$C_6$ alkyl,
  $C_7$-$C_{13}$ aralkyl, or
  $C_6$-$C_{14}$ aryl, unsubstituted or substituted by one or more $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ or $C_1$-$C_{12}$ thioether groups;

Y: is OH, oxygen, sulfur, N—$R^{10}$ or P—$R^{10}$;

N: is nitrogen;

$R^1$ to $R^9$: are, independently of one another, hydrogen,
  $C_1$-$C_{12}$ alkyl, wherein the alkyl groups may be branched or unbranched,
  $C_1$-$C_{12}$ alkyl, substituted one or more times by identical or different substituents, selected from the group consisting of $C_1$-$C_{12}$ alkyl groups, halogens, $C_1$-$C_{12}$ alkoxy groups and $C_1$-$C_{12}$ thioether groups,
  $C_7$-$C_{13}$ aralkyl,
  $C_3$-$C_{12}$ cycloalkyl,
  $C_3$-$C_{12}$ cycloalkyl, substituted one or more times by identical or different substituents, selected from the group consisting of $C_1$-$C_{12}$ alkyl groups, halogens, $C_1$-$C_{12}$ alkoxy groups and $C_1$-$C_{12}$ thioether groups,
  $C_6$-$C_{14}$ aryl,
  $C_6$-$C_{14}$ aryl, substituted by identical or different substituents, selected from one or more members of the group consisting of $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ and $C_1$-$C_{12}$ thioether groups,
  $C_1$-$C_{12}$ alkoxy,
  silyloxy $OSiR^{11}R^{12}R^{13}$,
  halogen,
  $NO_2$, or
  amino $NR^{14}R^{15}$,
  and wherein two adjacent radicals $R^1$ to $R^9$, may optionally form with one another, a saturated or unsaturated 5- to 8-membered ring;

$R^{10}$ to $R^{16}$ independently of one another, are hydrogen,
  $C_1$-$C_{20}$ alkyl, which may optionally be substituted by $O(C_1$-$C_6$ alkyl) or
  $N(C_1$-$C_6$ alkyl)$_2$,
  $C_3$-$C_{12}$ cycloalkyl,
  $C_7$-$C_{13}$ aralkyl or $C_6$-$C_{14}$ aryl;

and wherein at least one of the radicals $R^1$ to $R^9$ is in the form of a radical of the formula II below:

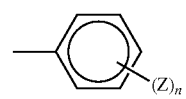

wherein Z is an electron-withdrawing group, and n is an integer from 1 to 5.

2. The process as claimed in claim 1, wherein Z in formula II is selected from one of the following electron-withdrawing radicals:
  $NO_2$, $SO_3$, F, $C_m F_{2m+1}$, where m is an integer from 1 to 10, or a mono- or polyfluorinated aryl.

3. The process as claimed in claim 1, wherein Z in the formula II is $CF_3$, and n is 2 or 3.

4. The process as claimed in claim 1, wherein the metal complex compound is used in combination with an activator.

5. The process as claimed in claim 1, wherein M in the formula I is nickel or palladium.

6. The process as claimed in claim 1, wherein ethylene is used exclusively as olefin.

7. The process as claimed in claim 1, wherein at least two olefins are used, selected from the group consisting of ethylene, propylene, 1-butene, 1-hexene, and styrene.

8. The process as claimed in claim 7, wherein ethylene is used in combination with propylene, 1-butene, 1-hexene or styrene.

9. The process as claimed in claim 1, wherein anionic, cationic and/or nonionic emulsifiers are used as the one or more dispersants.

10. The process as claimed in claim 1, wherein an organic solvent is present and is selected from the group consisting of aliphatic and aromatic hydrocarbons, fatty alcohols and fatty acids.

11. A process for preparing an aqueous polymer dispersion, by polymerizing one or more olefins in an aqueous medium in the presence of one or more dispersants, and, optionally, of organic solvents, said process comprising catalyzing the polymerization of said one or more olefins in the presence of one or more metal complex compounds of the formula I:

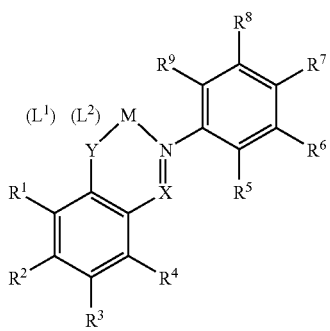

wherein the substituents and indices have the following meanings:

M is a transition metal from groups 7 to 10 of the periodic table of the elements;

$L^1$ is selected from the group consisting of phosphanes $(R^{16})_x PH_{3-x}$ and amines $(R^{16})_x NH_{3-x}$ with identical or different radicals $R^{16}$, ethers $(R^{16})_2 O$, $H_2 O$, alcohols $(R^{16})OH$, pyridine, pyridine derivatives of the formula $C_5 H_{5-x}(R^{16})_x N$, CO, $C_1$-$C_{12}$ alkylnitriles, $C_6$-$C_{14}$ arylnitriles and ethylenically unsaturated double bond systems, x denoting an integer from 0 to 3;

$L^2$ is selected from the group consisting of halide ions, amide ions $(R^{16})_h NH_{2-h}$, h denoting an integer from 0 to 2, $C_1$-$C_6$ alkyl anions, allyl anions, benzyl anions and aryl anions, and optionally, $L^1$ and $L^2$ may be linked to one another by one or more covalent bonds;

X: is nitrogen (N);

Y: is OH, oxygen, sulfur, N—$R^{10}$ or P—$R^{10}$;

N: is nitrogen;

$R^1$ to $R^9$: are, independently of one another, hydrogen,
  $C_1$-$C_{12}$ alkyl, wherein the alkyl groups may be branched or unbranched,
  $C_1$-$C_{12}$ alkyl, substituted one or more times by identical or different substituents, selected from the group consisting of $C_1$-$C_{12}$ alkyl groups, halogens, $C_1$-$C_{12}$ alkoxy groups and $C_1$-$C_{12}$ thioether groups,
  $C_7$-$C_{13}$ aralkyl,
  $C_3$-$C_{12}$ cycloalkyl,
  $C_3$-$C_{12}$ cycloalkyl, substituted one or more times by identical or different substituents, selected from the group consisting of $C_1$-$C_{12}$ alkyl groups, halogens, $C_1$-$C_{12}$ alkoxy groups and $C_1$-$C_{12}$ thioether groups,
  $C_6$-$C_{14}$ aryl,
  $C_6$-$C_{14}$ aryl, substituted by identical or different substituents, selected from one or more members of the group consisting of $C_1$-$C_{12}$ alkyl groups, halogens, mono- or polyhalogenated $C_1$-$C_{12}$ alkyl groups, $C_1$-$C_{12}$ alkoxy groups, silyloxy groups $OSiR^{11}R^{12}R^{13}$, amino groups $NR^{14}R^{15}$ and $C_1$-$C_{12}$ thioether groups,
  $C_1$-$C_{12}$ alkoxy,
  silyloxy $OSiR^{11}R^{12}R^{13}$,
  halogen,
  $NO_2$, or
  amino $NR^{14}R^{15}$,
  and wherein two adjacent radicals $R^1$ to $R^9$, may optionally form with one another, a saturated or unsaturated 5- to 8-membered ring;

$R^{10}$ to $R^{16}$ independently of one another, are hydrogen,
  $C_1$-$C_{20}$ alkyl, which may optionally be substituted by $O(C_1$-$C_6$ alkyl) or
  $N(C_1$-$C_6$ alkyl$)_2$,
  $C_3$-$C_{12}$ cycloalkyl,
  $C_7$-$C_{13}$ aralkyl or $C_6$-$C_{14}$ aryl;

and wherein at least one of the radicals $R^1$ to $R^9$ is in the form of a radical of the formula II below:

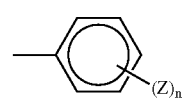

wherein Z is an electron-withdrawing group, and n is an integer from 1 to 5.

* * * * *